United States Patent [19]

Kazaoka et al.

[11] Patent Number: 4,682,763

[45] Date of Patent: Jul. 28, 1987

[54] FLEXIBLE MOUNTING

[75] Inventors: Kenichi Kazaoka, Nagoya; Hiroshi Okazaki, Toyota; Yasuhisa Inaba, Handa, all of Japan

[73] Assignee: Aisin Seiki Kabushiki Kaisha, Japan

[21] Appl. No.: 715,403

[22] Filed: Mar. 25, 1985

[30] Foreign Application Priority Data

Mar. 26, 1984 [JP] Japan .................................. 59-59094
Mar. 29, 1984 [JP] Japan .................................. 59-62041

[51] Int. Cl.⁴ .......................... F16F 3/00; F16F 25/00; A47C 3/00; A47C 7/02
[52] U.S. Cl. ..................................... 267/89; 267/144; 297/284; 297/452
[58] Field of Search ...................... 267/86, 87, 89, 103, 267/105, 110, 111, 131, 133, 136, 165, 182, 142, 144; 248/575, 576; 297/284, 452

[56] References Cited

U.S. PATENT DOCUMENTS

| 1,554,320 | 9/1925 | Allen ..................................... | 267/182 |
| 2,740,468 | 4/1956 | Gonia et al. ........................... | 267/89 |
| 2,818,105 | 12/1957 | Herider et al. ......................... | 267/89 |
| 2,868,276 | 1/1959 | Flint .................................... | 267/87 X |
| 2,893,475 | 7/1959 | Fodermaier ............................ | 267/89 |
| 3,052,459 | 9/1962 | Belsky ................................... | 297/284 |
| 3,378,299 | 4/1968 | Sandor ................................. | 267/89 X |
| 3,669,498 | 6/1972 | Meyers et al. ......................... | 297/452 |

FOREIGN PATENT DOCUMENTS

| 1417878 | 10/1965 | France ................................. | 267/89 |
| 0351727 | 1/1961 | Switzerland .......................... | 267/89 |

Primary Examiner—Andres Kashnikow
Assistant Examiner—Robert J. Oberleitner
Attorney, Agent, or Firm—Finnegan, Henderson, Farabow, Garrett & Dunner

[57] ABSTRACT

An adjustable cushion support device for adjusting the holding pressure applied to support a seat cushion. The adjustable support device includes a frame member having a first end and a second end to support the cushion. A spring member is mounted on the frame member between the first end and the second end for flexibly supporting a load. A control mechanism is mounted on the frame member and is connected to the spring member for adjusting the holding pressure applied to the spring member. The control mechanism includes an enforcing member pivotally supported on the frame member for pushing the spring member upwards, a biasing member for biasing the enforcement member, and an operating lever to control the inclination of the biasing member to regulate the holding pressure applied to the spring member.

6 Claims, 6 Drawing Figures

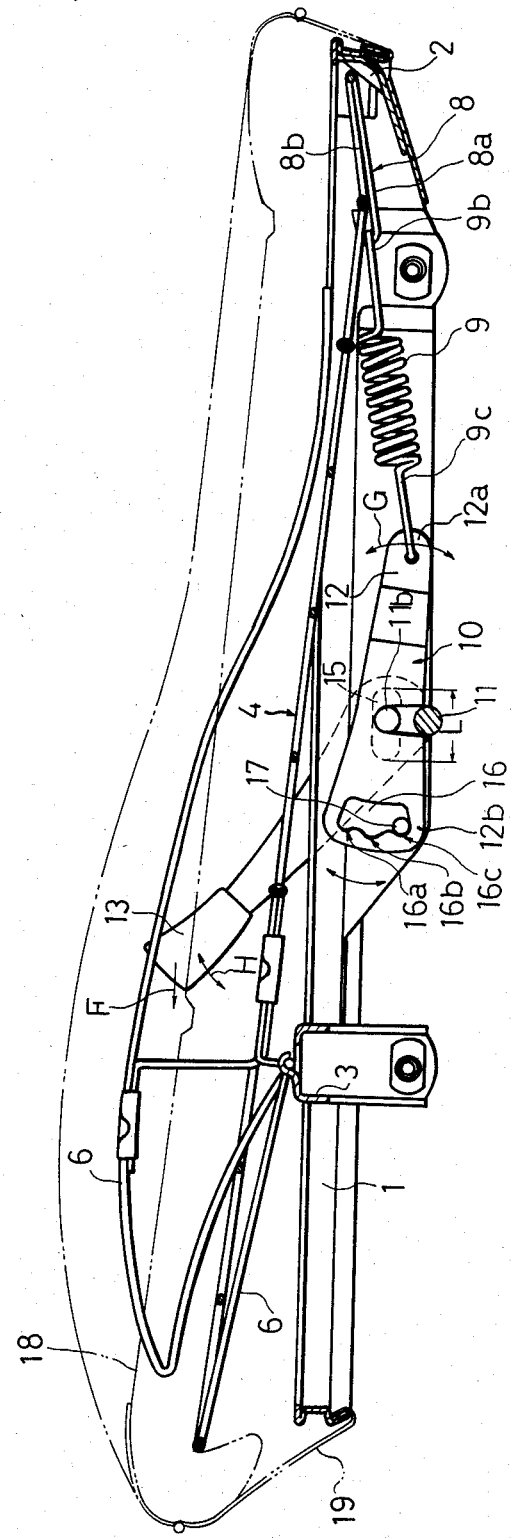

FLEXIBLE MOUNTING

BACKGROUND OF THE INVENTION

1. Field of the Invention

This invention relates to a flexible mounting employed in such cushion units as automobile seat cushion units, seat back units and bed cushion units.

2. Description of the Prior Art

Generally, the conventional flexible mounting, comprising a frame, a support for supporting such objects as a man, cargo, etc., and a flexible holder such as a spring for holding the support onto the frame, often causes inconvenience due to a constant resilience of said flexible holder.

A conventional flexible mounting typically employed in an automobile seat unit, for example, causes uncomfortable seat to some occupants. The resilience of the conventional flexible mounting cannot be adjusted in accordance with the weight of an occupant, road conditions and/or the length of driving. A soft seat which is comfortable for a light-weighted occupant may be depressed to the bottom by the weight of a occupant. While, a less-elastic seat which is good for a heavy occupant may be too hard for a light-weight occupant.

SUMMARY OF THE INVENTION

An object of the present invention is to provide an improved flexible mounting of which the resilience can be controlled as desired to overcome the aforementioned inconveniences.

Another object of the present invention is to provide an automobile seat cushion unit in which the hardness of the cushion can be controlled by an occupant.

The flexible mounting of this invention comprises a frame, a support and at least two holders holding the support to the frame, at least one of the holders being a flexible holder flexibly holding the support. The flexible holder comprises an arm pivotally held at first engagement parts thereof by the frame and supporting the support at second engagement parts thereof, a spring connected with the arm so as to provide force to the arm in such a direction as that in which the arm supports the support, and a control member located between the spring and the frame, the control member controlling the force direction of the spring by changing the relative position of the spring end opposite to the one with which the control member is connected.

The flexible mounting may be applied in the seat cushion unit of an automobile seating unit, on which the hip portion of an occupant contacts and applies the weight thereof. Further the flexible mounting may be employed in a seating back unit and/or a lumbar support on which the back portion of an occupant contacts and applies the weight thereof.

A conventional frame and support may be utilized for the frame and support of the flexible mounting of the present invention. Generally, the frame is of a material which may function as a base to hold the seating unit. When the present invention is applied in an automobile seating unit, the frame may be a seat frame which is slidable on an automobile floor. Generally, the frame has such a structure as made of a pipe or pressed sheet steel.

The support has a portion on which such objects as a man or cargo are to be mounted. A major function required of the support is to support such objects to be mounted thereon. Therefore, the support may be a plate-like member or a similar member having a certain level of hardness. In an automobile seating unit, a support generally comprises an internal part formed of wire springs of a corrugated shape and a cushion, made of such material as urethane, mounted thereon. Further the support may be a plate-like member composed of an outer frame and a cloth or a net covering the same, as a support generally employed in chairs.

At least two holders are used for supporting the support. For example, two holders are employed in respectively holding the front and rear sides of the support. Three holders may be used for respectively holding the front and rear sides of the support and the intermediate portion between the front and rear sides thereof.

The flexible mounting according to the present invention is employed at least for one of the holders. In the case when two holders are used as mentioned above, the flexible holder may be employed at least for one of them. In the case when three holders are used as mentioned above, the flexible holder may be employed for the holder for holding the intermediate portion of the support.

The intermediate portion of the support means the portion of the support, excluding the front and rear end parts thereof, on which the pressure is applied directly by the load mounted thereon and more specifically the portion on which the sacrum of an occupant is placed in such a case that the invention is employed in a seat cushion, and the portion on which the third lumbar vertebra area of an occupant is placed in such a case that the invention is employed in a seating back unit.

The flexible holder according to the present invention comprises an arm movable in a pivotal motion, a spring for providing force to the arm, and a control member for changing positions of the end of the spring end opposite to the end with which the control member is connected.

The arm is movable in a pivotal motion at the first engagement parts where the arm is held by the frame.

The arm may be bent in a crank shape so as to form a shape appropriate for the function thereof. The arm is held at at least two first engagement parts having approximately the same pivotal axis and at least one second engagement part having another pivotal axis to support the support, and a second arm portion having a third engagement part where the arm is connected with the spring at the position changable in relation to the pivotal motion of the second engagement part, with the first engagement parts being the pivotal axis. The first arm portion and the second arm portion may be made of a steel spring wire bent so as to form a shape appropriate for the purpose of this invention.

Generally the spring employed in pulling the arm is a conventional helical tension spring. A helical compression spring, however, may be employed to press the arm in a special case. A major function required of the spring is to provide force to the arm in such a direction as that in which the arm supports the support.

A major function required of the control member is to alter the positions of the end of the spring opposite to the end with which the control member is connected. The control member may be a conventional control member appropriate for performing the function. The control member is rotatably as well as slidably held by the frame so that the relative position of the end of the spring opposite to the end with which the control member is connected can be altered by means of the movements provided to the control member at the frame. The force direction of the spring alters in relation to the positional change of the end of the spring opposite to the end with which the control member is connected. The amount of the force provided to the arm can be controlled thereby with the force of the spring being constant.

More preferably, the control member is provided with a mechanism which readily enables the spring end, opposite to the one with which the control member is connected, to move to a position and remain at the position as desired.

The control member, for example, may be of such a member as having a narrow stick or plate shape, and an end of which being rotatably held by the frame, and the other end of which being pivotally movable. In such a case, lock mechanism may be provided to hold the control member, of a narrow stick or plate shape, at a pivotal position thereof as desired. The lock mechanism may be such a conventional mechanism as a ratchet, for example. Further, the control member may employ link mechanism therefor.

As having been explained heretofore, the resilience of the flexible mounting of the present invention can be adjusted as desired by controlling the force provided by the spring.

The flexible mounting can control the spring force by altering the position of the end of the spring opposite to the end with which the control member is connected, by means of the control member operated by an occupant.

BRIEF DESCRIPTION OF THE DRAWINGS

Further objects, features and advantages of this invention will become apparent from a consideration of the following description, the appended claims, and the accompanying drawings in which:

FIGS. 2-4 show a first embodiment of this invention employed in an automobile seating cushion unit wherein, FIG. 2 is a perspective view of the cushion unit showing the inside thereof;

FIG. 3 is an enlarged side view of the first embodiment showing principal portion thereof;

FIG. 4 is a graph indicating the relation between the weight of the load mounted on the support and the deflection of the support thereby;

FIGS. 5 and 6 show a second embodiment of this invention also employed in an automobile seating cushion unit wherein, FIG. 5 is a perspective view of the cushion unit showing the inside thereof;

FIG. 6 is an enlarged side view of the second embodiment showing principal portions thereof.

DESCRIPTION OF THE PREFERRED EMBODIMENTS

Figure 1:
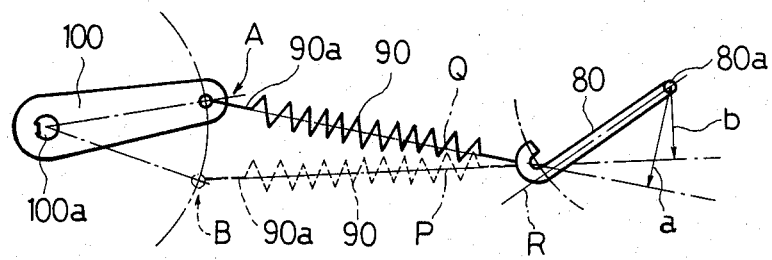
FIG. 1 is a schematic representation showing a flexible holder of the embodiments of this invention.

Referring now to the drawings, wherein like reference numerals designate identical or corresponding parts throughout the several views, and more particularly to the embodiment depicted in FIG. 1, a flexible holder comprises an arm 80 pivotally movable at a pivotal axis 80a due to a downward pressure applied on a support held thereby, a spring 90, of a conventional helical tension spring, connected with the arm 80, and a control member 100 pivotally movable at a pivotal axis 100a.

FIG. 1 further shows that a force direction Q of the spring 90 and a linear axis R of the arm 80 form an angle at the joint thereof due to the downward pressure applied on the arm 80 which holds the support.

The spring end 90a alters its position upwardly or downwardly in accordance with the pivotal motion provided to the control member 100, the pivotal axis 100a of which being the center of its motion.

Provided the tension of the spring 90 is a constant value F (FIG. 6), the control member 100 is disposed at a position A as indicated in a solid line, and the force direction of the spring 90 is set in the direction of the line Q, the moment generated thereby will be the product of F and a (F×a). Whereas, in such a case that the control member 100 is moved to a position B and the force of the spring 90 is applied a direction P, the moment generated thereby will be the product of F and b (F×b). Since a>b is apparent, as shown in FIG. 1, then F×a>F×b. Therefore, the moment to be generated is controllable, with the tension of the spring 90 being constant. Hence the pressure to be applied on the arm 80 can be controlled.

Figure 4:
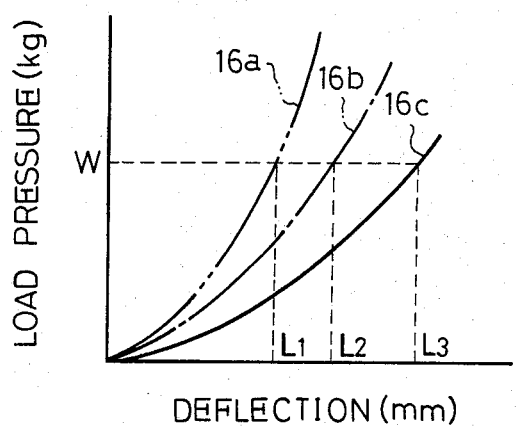
Figure 2:
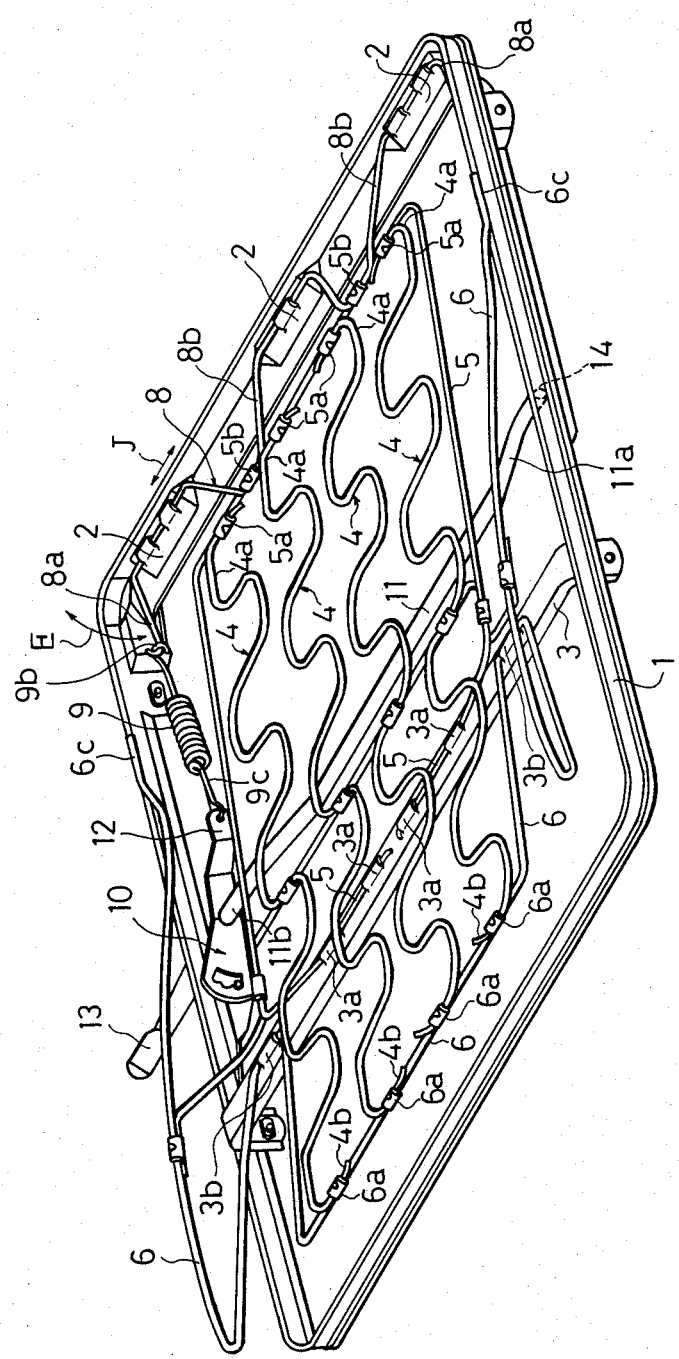

FIGS. 2-4 show the first embodiment of an automobile seating cushion unit of the present invention. FIG. 2 is a perspective view of principal portions of this embodiment with the seating cushion pad and covering material therefor removed. FIG. 3 is a side view of the first embodiment, showing principal portions of FIG. 2 enlarged for the purpose of clarity. FIG. 4 is a graph indicating the relation between the downward pressure applied by the load mounted on springs 4, shown in FIG. 2, and the resultant deflection of the springs 4.

FIG. 2 shows the cushion frame 1 of this embodiment made of a pressed sheet steel formed in a rectangular shape, retainers 2 provided at the rear side of the cushion frame 1, and a frame 3 bridged between the left and right sides of the frame 1, adjacent the front side of the frame 1, in parallel with the rear and front sides of the frame 1.

The support of this embodiment comprises four springs 4 of corrugated shape and equal pitch, spaced apart between the left and right sides of a frame 5 having a generally rectangular shape for holding the four springs 4. The downward pressure shall be applied on the springs 4 due to the weight of the occupant and cushion pad to be mounted thereon.

FIG. 2 further shows that ends of the frame 5 are fitted in holes 3a formed on the top side of the frame 3 to be secured thereby. Spring ends 4a of the springs 4 are secured by tubes 5a.

Forward or rearward holding means or holders are employed in this embodiment for holding the front and rear end sides, respectively of the springs 4.

The holder of the embodiment for holding the front end side of the support is made of a narrow steel wire 6, which is bent so as to form a shape appropriate function thereof. In order to hold spring ends 4b of the springs 4 to the cushion frame 1, this embodiment employs an assembly in which a steel wire 6 is fitted through holes 3b provided on the frame 3. In addition, the spring ends 4b of the springs 4 and the steel wire 6 are secured together by the tubes 6a. Therefore, the steel wire 6 is firmly supported the frame 3 and the cushion frame 1.

The holder for holding the rear end side of the support is the flexible holder characteristic of this embodiment.

The flexible holder comprises a generally crank-shaped arm or arm sections 8, a spring 9 and a control member 10. The arm of the embodiment is comprised of two portions as illustrated in FIG. 2, namely a first arm portion 8b and second arm portions 8a located at the ends of the arm 8b. The first arm portion 8b is fitted at first engagement parts through the holes formed on the retainers 2 to be pivotally attached to the cushion frame 1. Hence the arm 8 may be pivoted at the first engagement parts, i.e., the holes formed on the retainers or retention means 2 being the pivotal axis, in the directions indicated by arrows E. The first arm portion 8b is also attached at at least a second engagement part to the frame 5 by tubes 5b formed thereon. Thus, the arm 8 holds the springs 4 which function as the support. Thus, the spring ends 4a of the springs 4 move according to the pivotal movement of the arm 8 at the holes formed on the retainers or retention means 2 in the directions indicated by the arrows E. Therefore, the depression level of the springs 4 at their ends 4a can be controlled with the pivotal movement of the arm 8.

The spring 9 of this embodiment is a helical tension spring, a spring end 9b and the other spring end 9c of which being formed in a hook shape as shown in FIG. 2. The spring 9 is connected with the arm 8 by the spring end 9b thereof hooked to the third engagement part, also hook shaped, of the second arm 8a.

The control member 10 for this embodiment constitutes plate means or enforcement means, and comprises a rod 11 bridged between the left and right sides of the frame 1, a plate 12 attached to the rod 11, therewith forming a single body, and an operation lever 13 provided at an end of the rod 11. A rod end 11a is held at a round hole 14 provided on the left side of the cushion frame 1 (the bottom side of the cushion frame 1 descending diagonally right to left in FIG. 2). The rod end 11b is inserted through the right side of the cushion frame 1 (the top side of the cushion frame 1 ascending diagonally right to left in FIG. 2), i.e., the rod end 11b is inserted through a laterally elongated hole or slot 15 provided on the right side of the frame 1, so that the rod 11 can move within the elongated hole defined by the length L.

Thus, the rod end 11b is enabled to move pivotally as far as the length L of the elongated hole 15, the round hole 14 being at the pivotal axis.

As viewed in FIG. 3, when the operation lever is pushed down, the crank-shaped rod moves to the left within the elongated hole 15 and the spring 9 is moved slightly upward. On the other hand, when the operation lever is pulled up, the rod moves to the right within the elongated hole 15, causing the spring to move slightly downward, thus varying the support provided by springs 4, as shown in FIG. 4.

A plate 12 is provided with a cam hole 16 as shown in FIG. 3. The cam hole 16 is provided with cavities 16a, 16b, and 16c arranged therein vertically. FIG. 3 further shows arresting means, such as a pin 17, provided on the cushion frame 1 so as to contact with the cam hole 16, along with a cushion pad 18 and a cushion cover 19.

The position of the spring ends 9c is altered by means of the control member 10 as explained presently. As the operation lever 13 is slid manually in a foreward direction, as indicated by an arrow F in FIG. 3, the rod 11 slides foreward along the elongated hole 15, resisting the tension of the spring 9. The sliding motion provided to the rod 11 further releases the contact of the cam holes 16a, 16b or 16c with the pin 17. The operation lever 13 will be rotated in the directions indicated by arrows H, as the contact of the cam hole 16a, 16b or 16c with the pin 17 is released as set forth above and a plate end 12a alters its position in the directions as indicated by arrows G, the rod 11 being the axis of the motion. The movement of the plate end 12a in the directions as indicated by the arrows G, in turn, will cause the spring end 9c to move upwardly or downwardly. As the position of the spring end 9c changes upwardly or downwardly, the force direction of the spring 9 alters as illustrated by the embodiment of this invention as shown in FIG. 1. Consequently, the downward pressure applied on the arm 8 can be controlled, with the tension of the spring 9 being constant.

The rotating motion of the operation lever 13 may be stopped when the position of the spring end 9c is is adjusted to desired extent. The plate 12 of the control member 10 will be automatically pulled toward the spring 9, and one of the cavities 16a, 16b and 16c will readily contact the pin 17. Hence the spring end 9c of the spring 9 will be positioned as desired.

FIG. 4 indicates the relation between the downward pressure applied on the springs 4 functioning as the support and the deflection of the springs 4. The aforementioned moment becomes the largest in the case when the pin 17 contacts with cam hole 16a. Thus, in the case when load W is applied on the springs 4, the deflection of the springs 4 becomes L1. When the pin 17 contacts the cam hole 16b, the deflection of the springs 4 is L2 (L1<L2) and as the pin 17 contacts with the cam hole 16a, the deflection of the springs 4 reaches L3 (L1<L2<L3).

An additional control member 10 may be provided at the side of the cushion frame 1 opposite the one at which the control member is provided in this embodiment, although the control member 10 is only shown at one side of the cushion frame 1. In such a case, the hole 14 shall be formed in the same figure as the laterally elongated hole 15 on the other side of the frame 1. The two control members 10 will move synchronously by means of the linkage made by the rod 11, so that the operation lever 13 needs to be provided only for one of the two control members 10 at either side of the frame 1.

An advantage of this embodiment is that the downward pressure applied on the arm 8 can be controlled without altering the tension of the spring 9, thereby controlling the depression of the springs. Likewise the depression of the seat cushion and the height of the seat cushion unit can be adjusted depending on considerations such as, road conditions, the length of driving, and the weight of an occupant. Therefore, a single seat of this type can meet the needs felt by any number of users.

Another advantage of this embodiment is that the degradation which may occur in the springs 4 and other parts of the seat unit due to extended use, i.e., more than several years of use, such as a fatigue in the springs 4, can be compensated for by means of the control given to the downward pressure applied on the seating cushion unit with the rotating motion provided to the operation lever 13.

A further advantage of this embodiment is that the lateral movement of the arm 8, i.e., the movement in the direction as indicated by arrows J in FIG. 2, is restrained and the distance between the frame 1 and the springs 4 is kept constant. Hence, the arm 8 functions as a stabilizer to prevent the seat from sliding.

Figure 5:
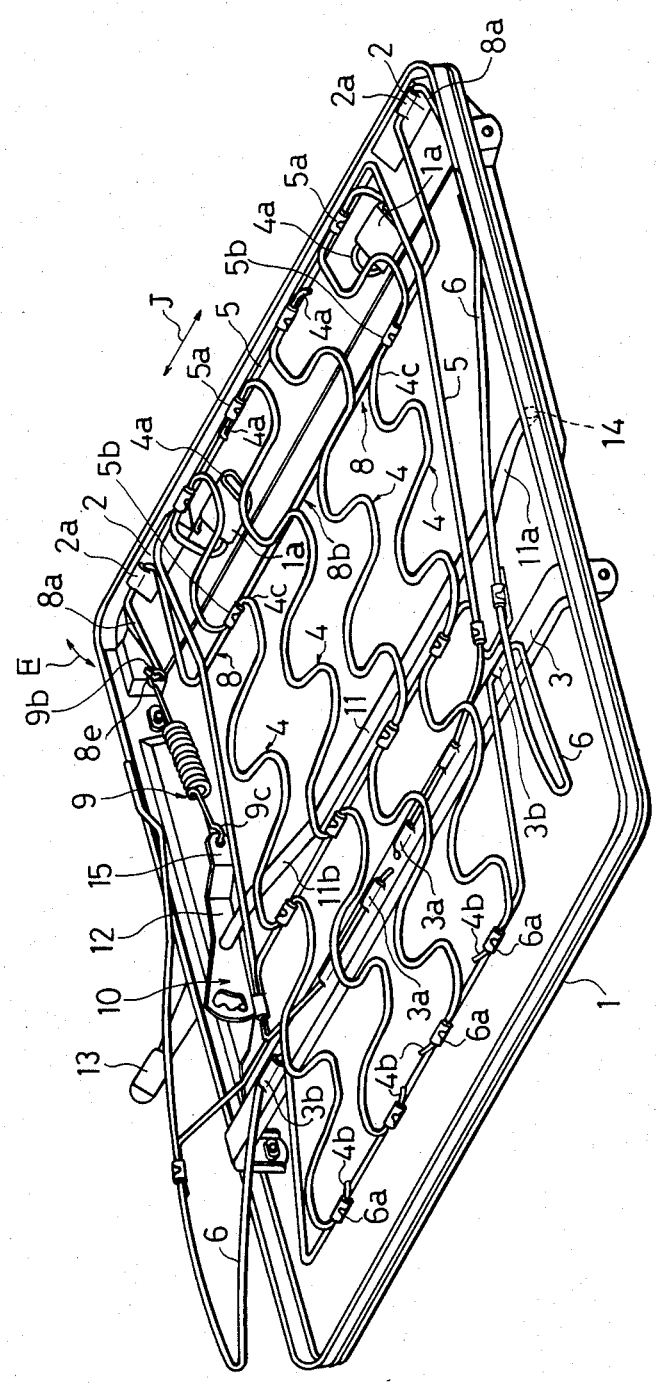
Figure 6:
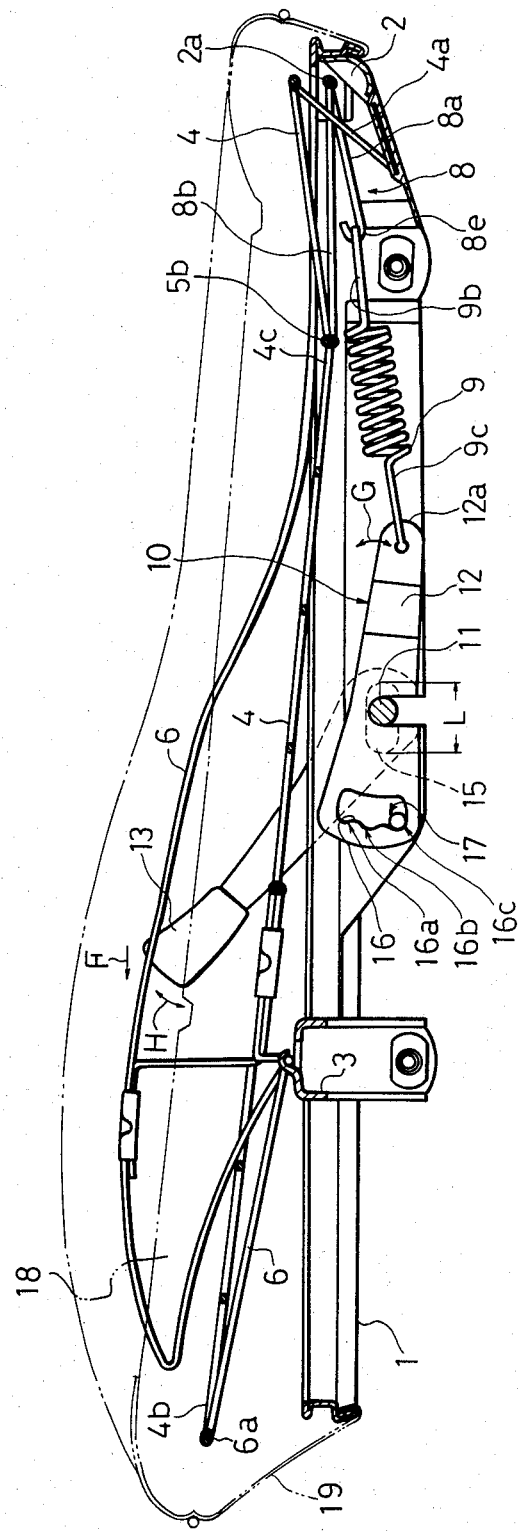

FIGS. 5 and 6 show the second embodiment of this invention applied for an automobile seat cushion unit: FIG. 5 is a perspective view of principal portions of this embodiment with the seat cushion pad and covering material removed. FIG. 6 is a side view of the embodiment, showing principal portions of FIG. 5, enlarged for the purpose of clarity.

The basic structure of the second embodiment is approximately the same as that of the first embodiment; however, a flexible holder is employed for the intermediate holding member of the second embodiment for holding portions between the front and rear sides of the support.

The second embodiment shall be explained with a particular emphasis on the portions thereof different from the first embodiment.

The outer frame of this embodiment includes a cushion frame 1 having retainers 2 and fixing members 1a are formed on the rear end side of the cushion frame 1.

The support of the embodiment comprises four spaced springs 4 of corrugated shape and a generally rectangular frame 5 holding the four springs 4 together.

In order to hold spring ends 4b of the springs 4 on the cushion frame 1, the spring ends 4b are inserted through tubes 6a provided on a steel wire 6 functioning as a holder. Spring ends 4a of the spring 4 are held at the cushion frame 1 in such a manner that spring ends 4a of two outer springs 4 are secured by fixing members 1a provided on the cushion frame 1, and spring ends 4a of two inner springs 4 are fitted through tubes 5a provided on the frame 1.

The rear side of the frame 5 is fitted through tubes 5a as shown in FIG. 5.

The intermediate holder according to this embodiment, a flexible holder as set forth before, comprises an arm 8 bent in a crank shape, a spring 9, and a control member 10. The arm 8 comprises the second arm portions 8a located at the ends thereof and the first arm portion 8b constituting the intermediate portion thereof.

The first engagement parts of the first arm portions 8b are inserted through holes 2a of retainers 2 and are thereby held at the frame 1 as shown in FIG. 5. (One retainer 2 is provided at each end of the rear side of the frame 1. Each retainer is provided with the hole 2a. Therefore, the total number of the holes 2a are two. In addition, the two holes 2a of the retainers 2 are on the same axis.)

Thus, the arm 8 is enabled to move pivotally as indicated by arrows E at the first engagement parts held in the holes 2a of the retainers 2.

The second engagement parts of the first arm 8b are fitted through tubes 5b and thereby support intermediate portions 4c of the springs 4 as shown in FIG. 5 (The tubes 5b, the second engagement parts, have a common axis different from the one for the holes 2a of the retainers 2 as shown in FIG. 5.). The pivotal movement of the arm 8 as indicated by the arrows E, wherein the holes 2a of the retainers 2 are the pivotal axis, enables the intermediate portions 4c of the springs 4 to move accordingly.

Thus, the depression level at the intermediate portions 4c of the springs 4 can be controlled with the pivotal movement provided to the arm 8. In addition, the intermediate portions 4c of the springs 4 are located at the portion of a seat cushion with which the sacrum of an occupant comes to contact.

The position of the spring ends 9c is altered by means of the control member 10 as explained hereinafter. As the operation lever 13 is slid manually in a forward direction as indicated by an arrow F in FIG. 6 and employed in the first embodiment, the sliding motion provided to the rod 11 releases the contact of the cam holes 16a, 16b or 16c with a pin 17. Further, the operation lever 13 will be rotated in the directions indicated by arrows H, whereby a plate end 12a alters its position in the directions as indicated by arrows G, with the rod 11 being the axis of the motion. The movement of the plate end 12a in the directions as indicated by the arrows G, in turn, will cause the spring end 9c to move upwardly or downwardly. As the spring end 9c changes its position upwardly or downwardly, the force direction of the spring 9 alters accordingly, and thereby the downward pressure applied on the arm 8 can be controlled, with the tension of the spring 9 being constant. Thus, the degree of the flexible resistance at the intermediate portions 4c of the springs 4 (the portion of a seat cushion with which the sacrum of an occupant comes to contact) can be controlled.

An advantage of this embodiment is that the donwnward pressure applied on the arm 8 can be controlled without altering the tension of the spring 9, thereby controlling the depression of the intermediate portions 4c of the springs 4, i.e., the portion of a seat cushion with which the sacrum of an occupant is in contact. Likewise, the depression at the portion of the seat cushion with which the sacrum of an occupant contacts and the seating height can be adjusted in accordance with road conditions, the length of driving and/or the weight of an occupant.

Obviously, many modifications and variations of the present invention are possible in the light of the above teachings. It is therefore to be understood that within the scope of the appended claims, the invention may be practiced otherwise than as specifically described.

What is claimed is:

1. An adjustable cushion support comprising:
a cushion;
a frame member for supporting said cushion;
spring means mounted on said frame member for directly supporting said cushion;
holding means connecting said spring means to said frame member for flexibly holding said spring means; and
control means mounted on said frame member and connected to said spring means for adjusting the holding pressure applied to said spring means, said control means including:
enforcement means pivotally supported on said frame member for pushing said spring means upward, said enforcing means having a first arm portion connected to said spring means and a second arm portion;
biasing means connected to said second arm portion for maintaining the holding pressure applied by said enforcement means to said spring means; and
an operating lever mounted on said frame member and having a control arm connected to said biasing means and movably positioned along said frame member to control the inclination of said biasing means, thereby regulating the holding pressure applied to said spring means, said operating lever also having arresting means for affixing said operating lever to said frame member.

2. An adjustable cushion support according to claim 1, wherein said first and second arm portions are integrally connected to form a substantially v-shaped crank, said first arm portion of said crank having a first tip and said second arm portion of said crank having a second tip connected to said biasing means.

3. The adjustable cushion support defined in claim 1, wherein said forward holding means includes a front frame pivotally attached to said bar means and said spring means includes a series of serpentine springs secured to said front frame proximate said front portion of said frame member.

4. An adjustable cushion support comprising:
a cushion;
a frame member for supporting said cushion and having a front portion and a rear portion;
bar means extending between opposite sides of said frame member proximate said front portion;
support means mounted on said frame member between said front portion and said rear portion for flexibly supporting a load imposed thereon, said support means including:
spring means for directly supporting said cushion;
forward holding means connecting said spring means to said bar means for holding said spring means to support said cushion and for limiting movement between said support means and said frame member; and
rearward holding means connecting said spring means to said rear portion for holding said spring means to support said cushion and for limiting movement between said support means and said frame member;
control means mounted on said frame member and connected to said support means for adjusting the holding pressure applied to said spring means, said control means including:
a rotatable operating lever;
plate means connected to said frame member and operatively connected to said operating lever for movement therewith;
biasing means extending between said plate means and said support means for maintaining the holding pressure applied to said spring means depending upon the inclination of said biasing means; and
engagement means formed along said plate means for adjusting the inclination of said biasing means in response to said operating lever, thereby regulating the holding pressure applied to said spring means.

5. The adjustable cushion support defined in claim 4, wherein said rearward holding means includes:
a rear frame, said serpentine springs being secured to said rear frame proximate said rear portion of said frame member;
arm sections extending between said rear frame and said rear portion; and
retention means for pivotally attaching said arm sections to said rear frame.

6. An adjustable cushion support comprising:
a cushion;
a frame member to support said cushion and having a first end and a second end;
support means mounted on said frame member between said first end and said second end for flexibly supporting a load imposed thereon;
control means mounted on said frame member and connected to said support means for adjusting the holding pressure applied to said support means, said control means including:
a rotatable operating lever, having arresting means for affixing said operating lever to said frame member;
plate means connected to said frame member and operatively connected to said operating lever for movement therewith;
biasing means extending between said plate means and said support means for maintaining the holding pressure applied to said spring means depending upon the inclination of said biasing means; and
engagement means formed along said plate means for adjusting the inclination of said biasing means in response to rotation of said operating lever, thereby regulating the holding pressure applied to said spring means.

* * * * *